(12) United States Patent
Alston (10) Patent No.: US 9,928,655 B1
(45) Date of Patent: Mar. 27, 2018

(54) PREDICTIVE RENDERING OF AUGMENTED REALITY CONTENT TO OVERLAY PHYSICAL STRUCTURES

(71) Applicant: Amazon Technologies, Inc., Seattle, WA (US)

(72) Inventor: Samuel Jared Alston, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 14/841,261

(22) Filed: Aug. 31, 2015

(51) Int. Cl.
| | |
|---|---|
| G09G 5/00 | (2006.01) |
| G06T 19/00 | (2011.01) |
| G06F 3/01 | (2006.01) |
| G06T 7/00 | (2017.01) |

(52) U.S. Cl.
CPC ............ *G06T 19/006* (2013.01); *G06F 3/012* (2013.01); *G06T 7/0044* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 2011/0206124 | A1* | 8/2011 | Morphet | H04N 5/145 375/240.16 |
| 2015/0009236 | A1* | 1/2015 | Saito | G02B 27/017 345/656 |
| 2015/0145889 | A1* | 5/2015 | Hanai | H04N 5/2621 345/633 |
| 2016/0140729 | A1* | 5/2016 | Soatto et al. | G01S 5/16 348/135 |

OTHER PUBLICATIONS

Kyle Orland, "How Microsoft's predictive modeling could make streaming gaming tolerable", Aug. 24, 2014, Retrieved Aug. 31, 2015, <http://arstechnica.com/gaming/2014/08/how-microsofts-predictive-modeling-could-make-streaming-gaming-tolerable/>.
Kyungmin Lee et al., "Outatime: Using Speculation to Enable Low-Latency Continuous Interaction for Cloud Gaming", Aug. 21, 2014, pp. 1-14, <http://research.microsoft.com/pubs/226843/outatime_techreport2014.pdf>.

* cited by examiner

*Primary Examiner* — David H Chu
(74) *Attorney, Agent, or Firm* — Patterson+Sheridan, LLP (57) ABSTRACT

Embodiments herein include an augmented reality (AR) system that predictively renders images which may reduce or remove lag. Instead of rendering images in response to sensing changes in the user orientation, the AR system generates predictive images by predicting future user orientations. The AR system can render multiple predictive images that each includes AR content that will be displayed at a future time. Because the predictive images are generated using different user orientations, the location of an object in the AR content in each of the predictive images is different. The predictive images are transmitted to the AR device which selects one of the images to display by comparing the orientations used to generate each of the predictive images with the current (actual) orientation of the user.

22 Claims, 6 Drawing Sheets

PREDICTIVE RENDERING OF AUGMENTED REALITY CONTENT TO OVERLAY PHYSICAL STRUCTURES

BACKGROUND

Virtual or augmented reality headsets have long been used for many different applications, spanning many different technological fields. In virtual reality systems, computer-generated virtual scenes are generally provided on an opaque display. In mixed and augmented reality systems, computer-generated virtual scenes or objects are combined with the views of a real-world scene on a see-through display.

BRIEF DESCRIPTION OF DRAWINGS

Various embodiments in accordance with the present disclosure will be described with reference to the drawings, where like designations denote like elements.

DETAILED DESCRIPTION

Embodiments presented herein provide techniques for predictively rendering images that include content for augmenting physical surfaces in the real world. As the user viewpoints shifts, an augmented reality (AR) device updates a displayed image so that the AR content overlays the identified surface(s) in the real world. For example, the AR device may be a headset worn by the user that includes a display for overlaying the AR content on a particular surface in the real world. Ideally, as the orientation of the user changes, the AR device updates the display such that the AR content maintains the proper relationship with the underlying surface to produce the desired visual effect. However, limits in processing speed in the AR device may prevent the device from responding fast enough to changes in the user orientation to perfectly overlay the physical surface with the AR content. As such, the user may notice that the AR content lags behind the changes in orientation such that the AR content moves off of the selected surface. The result is a deterioration in the user experience.

In one embodiment, an AR system predictively renders images to reduce or remove this lag. Instead of rendering images in response to sensing changes in the user orientation, the AR system generates predictive images by predicting future user orientations. For example, the AR content may be a media presentation such as a video or still image where the future objects to be displayed on the AR device are predictable. The AR system can render multiple predictive images that each includes one of the future objects of the AR content. Because the predictive images are generated using different user orientations, the location of the future object in each of the predictive images is different. For example, one predictive image may be rendered assuming the user will move her head to the left in which case the object of the AR content is shifted to the right in the predictive image. Conversely, another predictive image may be rendered assuming the user will move her head to the right in which case the same object is shifted to the left in the predictive image.

In one embodiment, the predictive images are transmitted to the AR device which selects one of the images to display. For example, the AR system may include a computing system separate from the AR device that renders the predictive images and transmits these images to the AR device using a communication link. To select which predictive image to display, the AR device may compare the orientations used to generate each of the predictive images with the current orientation of the user. In one embodiment, the AR device determines the current orientation of the user using sensors located on the device. The AR device then selects the predictive image that was rendered using a future user orientation that best matches the current (or actual) user orientation. Although the location of the AR content in the displayed image may be off slightly relative to an image rendered using the actual user orientation, this discrepancy may be unnoticeable to the user. In this manner, the AR system avoids the latency caused by measuring the user current orientation and rendering the image based on the current orientation. Instead, multiple predictive images are already rendered for a particular scene. The AR device only needs to choose the image that best fits the current user orientation.

Figure 1:
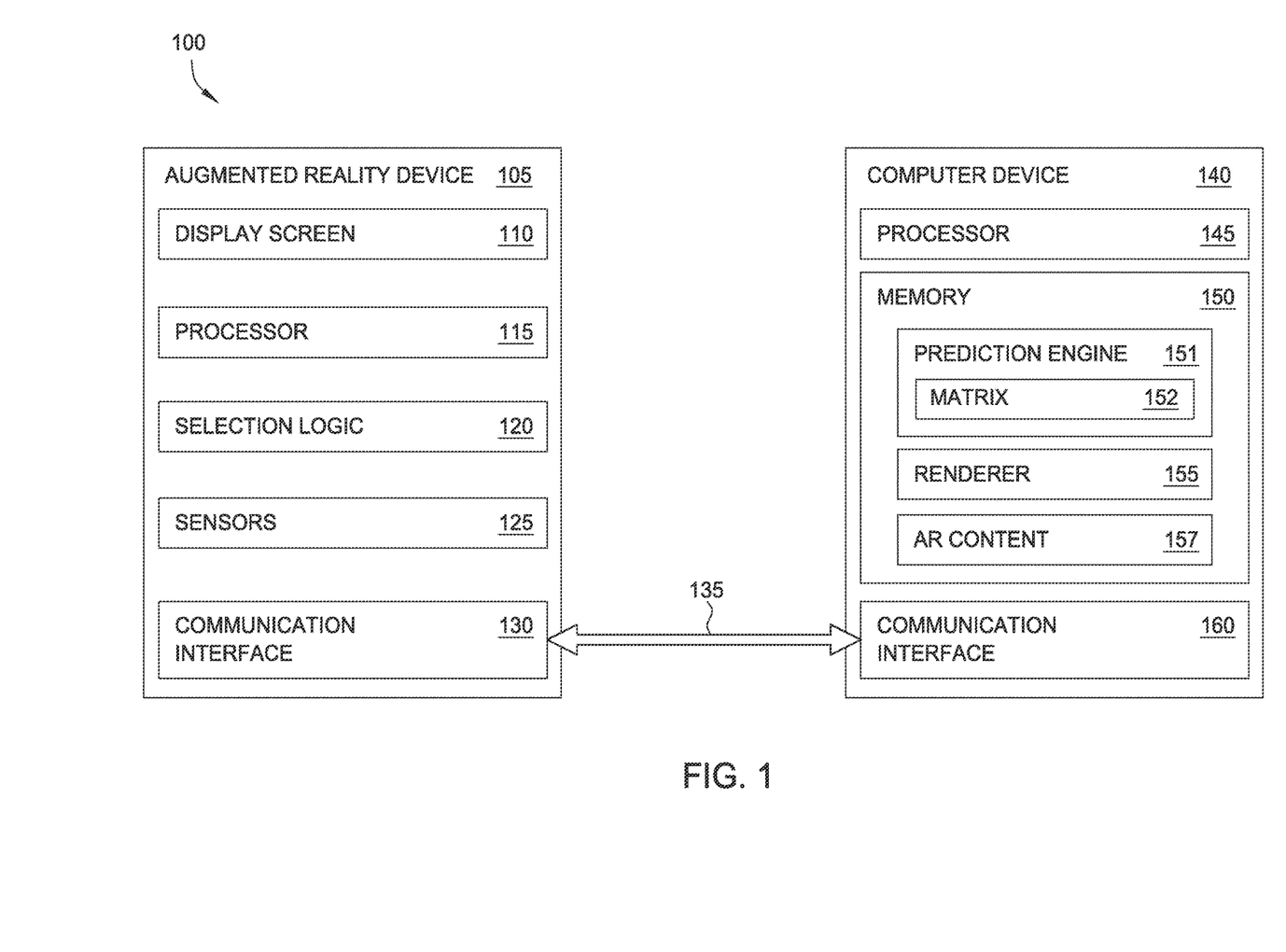
FIG. 1 illustrates a system for displaying augmented reality content, according to various embodiments.

FIG. 1 illustrates a system 100 for displaying AR content, according to various embodiments. The AR system 100 includes an AR device 105 and a computing device 140. The AR device 105 and the computing device 140 include respective communication interfaces 130, 160. The communication interfaces 130, 160 are configured to establish a bidirectional communication channel 135. The communication channel 135 may be a direct wired (e.g., twisted-pair) or wireless link (e.g., Bluetooth, Wi-Fi, etc.). In operation, the communication channel 135 provides a medium for transmitting sensor/orientation data to the computing device 140 and for transmitting a plurality of predictive AR images (based on the sensor/orientation data) to the AR device 105.

The AR device 105 includes a display screen 110, processor 115, selection logic 120, sensors 125, and communication interface 130. The display screen 110 may positioned between the eyes of the user and one or more objects or surfaces in the real world. In one embodiment, the AR device 105 is a headset that holds the display screen 110 in a fixed position relative to the user. As the head of the user moves, the display screen 110 also moves in a corresponding manner. In another embodiment, the AR device 105 is a handheld device such as a smartphone or tablet computer. The user can hold the AR device 105 such that a camera on one side of the device 105 captures an image which is then augmented and displayed on the screen 110 on a second, opposite side of the device 105 facing the user.

In one embodiment, the display screen 110 is transmissive such that visible light reflecting off the objects in the real world can pass through the display screen without being substantially attenuated by the screen 110. In this manner, the user can view parts of the real world as if the display screen 110 is not there. However, in another portion, the screen 110 may display AR content which overlays a particular surface or object in the real world. For example, the AR device 105 may determine that the current view of the user includes a physical movie poster that corresponds to AR content (e.g., a trailer about the movie). While the real world objects surrounding the movie poster remain viewable to the user through the display screen 110, the AR device 105 may display the AR content within the boundaries of the movie poster using the display screen 110. Thus, someone not wearing the AR device 105 simply sees a movie poster, while the user wearing the device 105 sees the AR content overlaying the movie poster. In one embodiment, the AR content displayed on the screen 110 is opaque such that the underlying real-world surface—e.g., the movie poster—is completely occluded. However, in other examples, the surface is only partially occluded by the AR content.

In one embodiment, instead of using a physical display screen to display the AR content, the AR device 105 may display the AR content by beaming the content directly onto the user's retina. For example, the AR device 105 may include a light source that scans or rasters a low power laser light directly on the retina thereby producing the AR content in the user's vision. In another embodiment, the user may where a contact lens on which the AR content is displayed.

The AR device 105 may use any number of different techniques to identify a real-world surface on which to display AR content. For example, the user may specify a particular surface to display AR content on and what that content should be. Alternatively, the AR device 105 may automatically detect a surface for displaying content without user input. For example, a surface may include an AR indicator such as a quick response (QR) code or bar code that is detected by a camera mounted on the AR device 105. In other examples, the AR device may process images captured by a camera to generate a hash which indicates whether AR content should be displayed on the image, or use a location of the user to determine if there is AR content corresponding to that location. Generally, the embodiments herein may be used with any technique for identifying a surface in the real world (including animate and inanimate objects) and selecting AR content to display on, or near, those surfaces.

The processor 115 represents any number of processing elements that each may include one or more processing cores. The processor 115 may be a general processor—e.g., a central processing unit (CPU)—or a special processor customized for performing the functions described herein—e.g., an application specific integrated circuit (ASIC). As discussed below, the processor 115 may not have to render the images displayed on the screen 105, in which case, the AR device 105 may include less processing power than a similar AR device 105 which does use a local processor to render images.

The selection logic 120 selects which of a plurality of predictive images to display on the screen 110. In one embodiment, the computing device 140 transmits the predictive images to the AR device 105 which each include an AR object that should be displayed at a particular time—e.g., the predictive images may each include the same frame of AR content. However, because the predictive images are rendered using different orientations of the device 105, the object is located at different locations in the predictive images. For example, the AR content may shift around in the images depending on whether the user moves her head to the left or right. Or the objects in the AR content may have different sizes depending on whether the user moves away or towards the surface on which the AR content is overlaid. Thus, even if only the size of the objects changes in the predictive images, the location of the objects in the images still changes. That is, changing the size of the object also alters its location in the image. In the embodiments below, it is assumed the AR device 105 is in a fixed spatial relationship with the head of the user such that the orientation of the device 105 is the same orientation as the user's head. However, the same techniques discussed herein may be applied to handheld AR devices 105 that may move independently of changes in the orientation of the head of the user. In this case, instead of tracking the orientation of the user, the AR system 100 monitors the orientation of the AR device itself.

In one embodiment, the selection logic 120 chooses one of the predictive images using data provided by the sensors 125. The sensors 125 may include accelerometers, depth sensors, eye trackers, geographic location sensors (e.g., infrared location devices or GPS), altimeters, and the like. Using the information provided by the sensors 125, the selection logic 120 can determine a current orientation of the AR device 105 and the user's head. To determine the orientation of the user, the selection logic 120 may determine the velocity of the device 105 in multiple directions, the height of the user, the direction the user is gazing, distance between the eyes of the user, and the like. The selection logic 120 compares the current orientation of the user to the orientations associated with each of the predictive images and chooses the orientation that best matches the current orientation. The corresponding predictive image is then displayed on the display screen 110. The AR device 105 may discard the unselected images.

The computing device 140 includes a processor 145, memory 150, and communication interface 160. The processor 145 represents any number of processing elements that each may include one or more processing cores. Moreover, memory 150 may include volatile memory, non-volatile memory, or combinations thereof. Although shown as a single physical device, the computing device 140 may be multiple physical computing devices communicatively coupled to perform the functions herein—e.g., a data center or a cloud service.

Memory 150 includes a prediction engine 151 that generates a matrix 152 of possible future orientations of the user. To do so, the prediction engine 151 may receive output data from the sensors 120 to determine the current orientation of the user. From this, the prediction engine 155 predicts a plurality of future orientations of the user by altering the current orientation. In this embodiment, the future orientations of the user may be presented by the matrix 152. A detailed description of the matrix 152 is provided below in reference to FIG. 5.

Memory 150 also includes a renderer 155 that generates predictive images using future, possible orientations of the user represented by the matrix 152. For each of the possible orientations, the renderer 155 generates a predictive image that includes future AR content 157. For example, the AR content 157 may be a video composed of multiple frames which include one or more objects. The renderer 155 selects one of the frames not yet displayed on the screen 110 and generates multiple predictive images that include the frame. Because each of the predictive images is rendered using a different orientation, the frame and objects in the frame are located in different positions in the predictive images. The computing device 140 can use the communication channel 135 to forward the predictive images to the AR device 105, which then selects one of the predictive images to display and discards the rest. In this manner, using actual orientations of the user or AR device 105, the renderer 155 generates predictive images for future possible user orientations that include predictively adjusted AR content 157.

Although the AR content 157 is discussed herein as being predefined content such as a video or a still image, in other embodiments, the AR content 157 may be a video game or other dynamic content that changes according to user input. Despite the fact the AR content 157 may change, the renderer 155 may be able to identify the next few frames of the AR content 157 that will be displayed on the screen 110 and generate multiple sets of predictive images for each of the frames and the objects in the frames as discussed above. Stated differently, the content of the dynamic AR content 157 may change slowly enough to enable the renderer 155 to identify the next few frames that will be displayed on the screen 110 and generate a set of predictive images for each frame.

Although the prediction engine 151 and renderer 155 are shown as located on the computing device 140, in one embodiment, identifying the future user orientations and rendering the predictive images may be done on the AR device 105. For example, when the processor 115 is idle or otherwise has sufficient processing capability, the AR device 105 may use its own co-located renderer to generate all of or a portion of the predictive images. However, when the processor 115 is busy, the renderer 155 may stop generating predictive images. That is, in one embodiment, the processor 115 performs predictive rendering when its hardware resources are idle or underutilized.

Figure 2A:
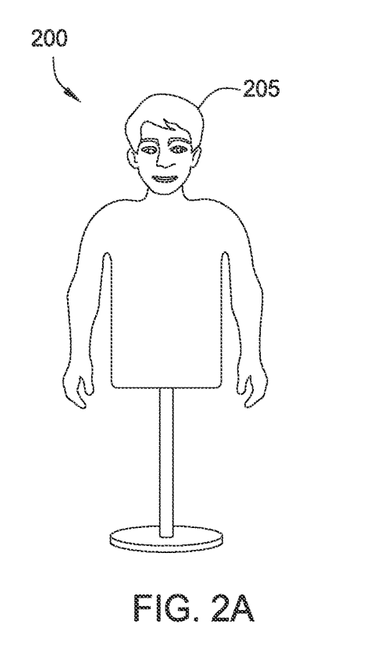
FIGS. 2A and 2B illustrate real-world and augmented reality views of the same scene, according to various embodiments.
Figure 2B:
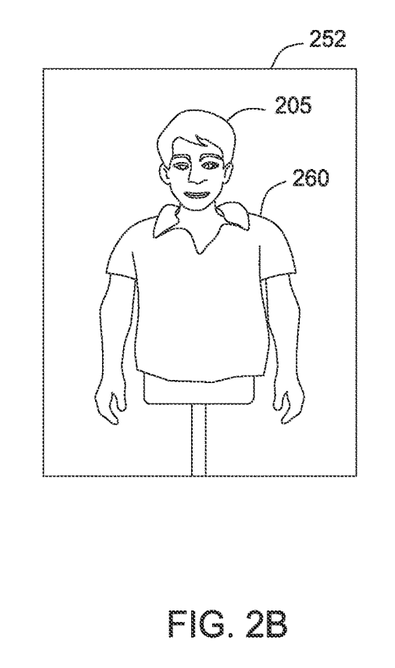

FIGS. 2A and 2B illustrate real-world and AR views of the same scene, according to various embodiments. In FIG. 2A, the real-world scene 200 includes a view of a mannequin 205 as seen without using an AR device. FIG. 2B, in contrast, illustrates an AR scene 250 as viewed using a display screen of an AR device. Both the real-world scene 200 and the AR scene 250 are viewed from the same user perspective in 3D space. In the AR scene 250, the user still sees some portions of the mannequin 205, however, other portions of the mannequin 205 are occluded by AR content 260 (e.g., a shirt object). That is, the image currently seen by the user through the display screen includes portions of the real-world (seen through the transmissive portions of the display screen) and the AR content 260 displayed on the opaque portions of the display screen.

As discussed above, the AR device may use any number of different techniques to identify a real-world surface (e.g., the mannequin 205) on which to display AR content. For example, the user could select the mannequin 205 and the AR content 260, or the AR device may automatically detect that the mannequin 205 corresponds to the AR content 260 using, for example, a QR code or bar code.

When viewing the AR content 260, the user may decide to view the AR content 260 from a different angle. Using clothes as an example, the user may want to see how the shirt looks like from the side or back. As the user changes the orientation of her head, the AR device updates the AR content 260 to correspond to the new view of the user. For example, as the user circles the mannequin 205, the AR device changes the AR content 260 to show different sides of the shirt.

Figure 3A:
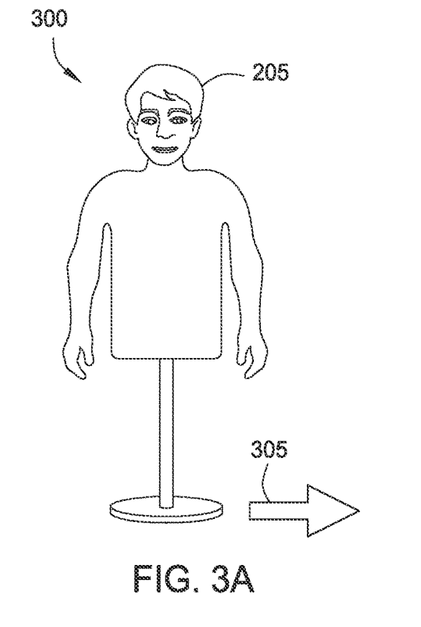
FIGS. 3A and 3B illustrate real-world and augmented reality views of the same scene, according to various embodiments.
Figure 3B:
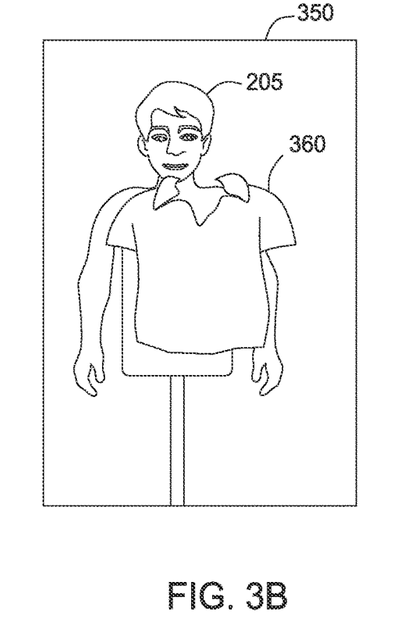

FIGS. 3A and 3B illustrate respective real-world and augmented reality views of the same scene, according to various embodiments. FIG. 3A illustrates a real-world scene 300 where the user has shifted her head to the right as indicated by arrow 305. When compared to scene 200 in FIG. 2A, in scene 300 the mannequin 205 has shifted left in the field of view of the user. In order to maintain the correct positional relationship between the mannequin and the shirt, the AR content (the shirt in this example) must be re-rendered based on the user's new position. In the event of unacceptably high latency in the re-rendering process (as determined by limits on human visual perception), a visual anomaly occurs in the form of a positional separation of the AR content 360 from the identified surface in the real world—i.e., the mannequin 205. This anomaly is illustrated in FIG. 3B.

Comparing AR scene 250 to AR scene 350 in FIG. 3B, the mannequin 205 has shifted to the left but the AR content 360 has not kept up with this shift. As such, the AR content 360 lags behind the real-world object as it moves in the user's field of view. This latency can undermine the immersive experience provided by the AR device. Moreover, as the user moves more rapidly, the distance the AR content 360 lags behind changes and the latency becomes more noticeable to the user.

Instead of rendering new images to be displayed in the AR device in response to detected changes in the user orientation, embodiments herein predictively render images for a plurality of possible future user orientations. In this manner, the latency shown in FIG. 3B can be avoided or mitigated. As shown in FIG. 1, instead of requiring the AR device 105 to render the next image to be displayed in the AR scene 350, the device 105 needs only to select from among a plurality of already rendered images. This selection process may require much less processing power from the AR device 105 than actually rendering the images. Not only does this improve the user's experience by mitigating or eliminating the latency, but the cost of the AR device 105 may be reduced since the device 105 does not need the processing power required to render images.

Figure 4:
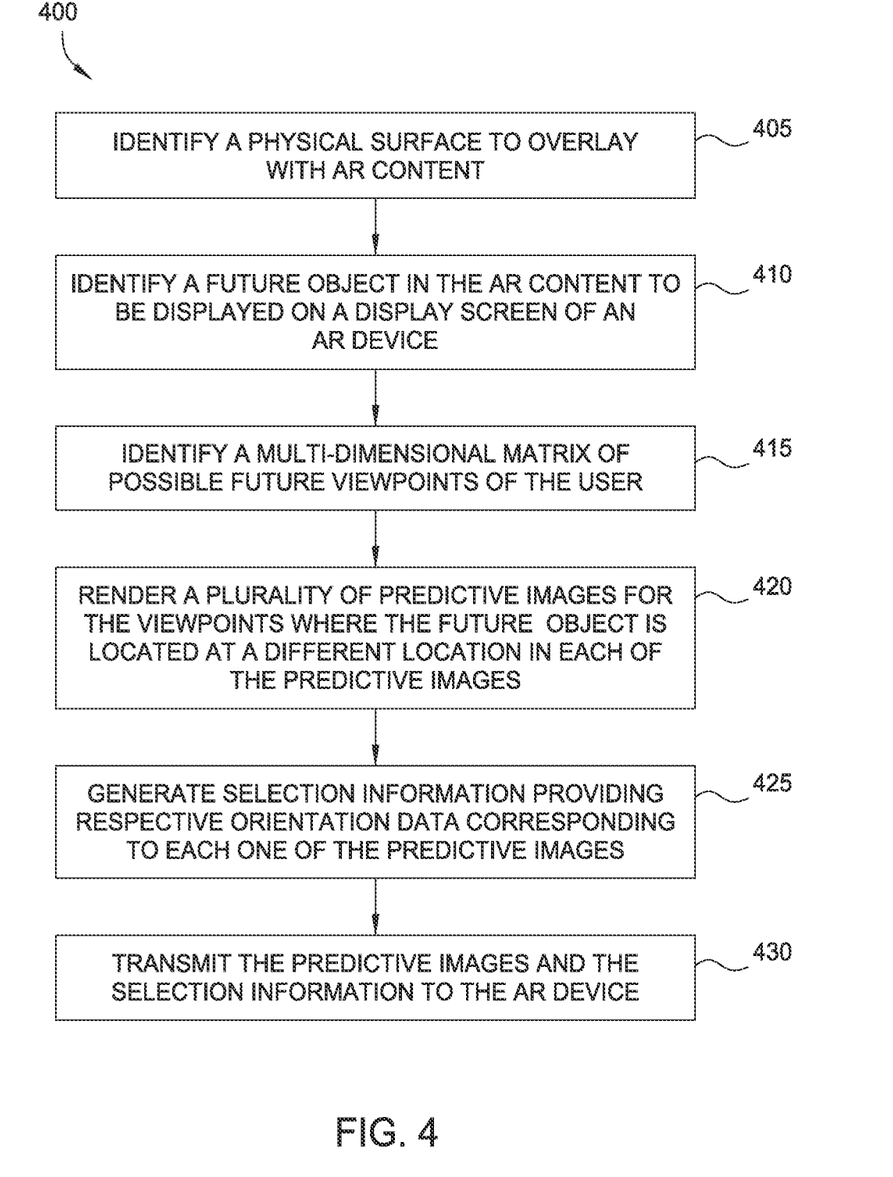
FIG. 4 is a flowchart for predictively rendering images to reduce latency, according to various embodiments.

FIG. 4 is a flowchart illustrating a method 400 for predictively rendering images to reduce latency, according to various embodiments. At block 405, an AR device identifies a physical surface to augment with AR content. The AR device may permit a user to select a surface or object to display AR content using an input/output (I/O) device such as a touch interface, motion tracker, button, etc. Additionally or alternatively, the AR device may include a camera that captures images of the user's field of view and identifies AR indicators such as QR codes, bar codes, specially formatted images, and the like which indicate the physical surface corresponding to particular AR content.

At block 410, the prediction engine in the AR system identifies an object of the AR content to be displayed on a display screen of the AR device. In one embodiment, the AR content is a video (including scripted animation in a videogame) or a still image where the future frames or images of this content are predefined and already stored in memory. Thus, the AR system can identify which objects are going to be displayed and when those objects should be displayed. However, even if the AR content is dynamic, the AR system may still be able to identify the object displayed in a timing window of some duration, e.g., 1500 ms. Identifying the objects to be displayed in the timing window may still provide the AR system with enough time to render the predictive images. In a gaming example, the AR content may change in response to user input. However, the actions that follow the user input may be predictable. For example, the user may instruct an avatar to swing a sword, in which case, the next several frames of the AR content—i.e., the action of the avatar swinging the sword—are known, and thus, can be predictively rendered as described herein.

Figure 5:
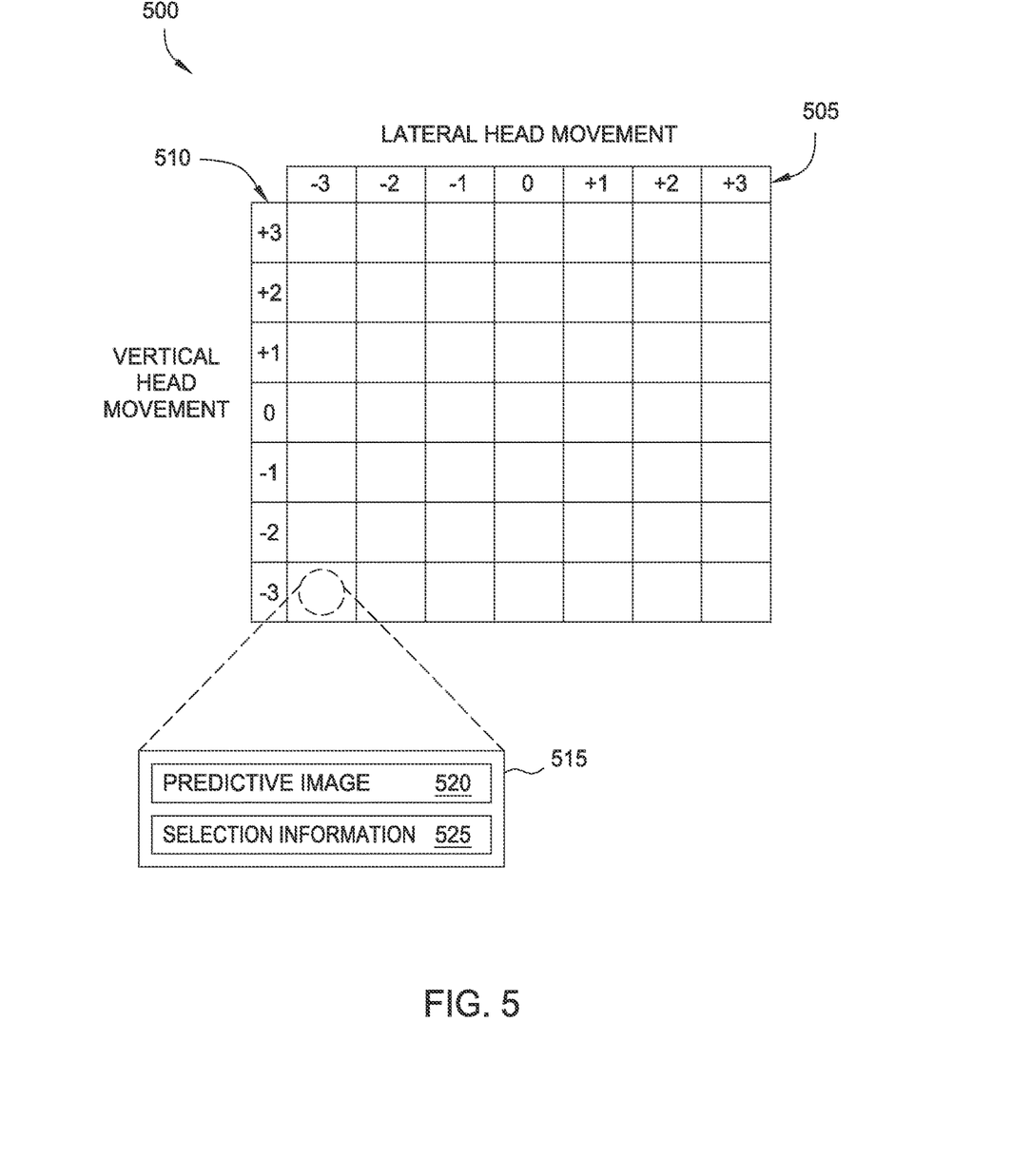
FIG. 5 illustrates a multi-dimensional matrix of predictively rendered images, according to various embodiments.

At block 415, the prediction engine identifies a multi-dimensional matrix of possible future viewpoints of the user. One example of a multi-dimensional matrix is shown in FIG. 5. Specifically, FIG. 5 illustrates a multi-dimensional matrix 500 of predictively rendered images where each dimension of the matrix corresponds to a different user movement or viewpoint. The matrix 500 includes two dimensions: lateral head movement as shown in the x-axis and vertical head movement as shown in the y-axis. However, the matrix 500 may include any number of dimensions. For example, other factors that may be used as dimensions include changes in height of the user, eye gaze, distance from the user and the surface displaying the AR content, and the like. In one example, the height of the user may be measured using an altimeter (along with accelerometer data) or a triangulation technique. Generally, each of these factors may correspond to a sensor in the AR system such that changes in these factors can be tracked. The sensors may be disposed on the AR device as shown in FIG. 1 and/or disposed external to the device such as an accelerometer in a personal device carried by the user.

In FIG. 5, the positions "0" in the x-axis label 505 and the y-axis label 510 correspond to the current viewpoint or orientation of the head of the user which may be identified by evaluating the current output of the sensors (e.g., at the time the AR system is first turned on). Using the zero positions as references, the x- and y-axis labels 505, 510 use discrete steps (e.g., −2, −1, +1, +2, etc.) to indicate a change in the user's head relative to the current position of the user's head. The discrete steps may either be linear changes or non-linear changes. As an example of linear changes, a change of −1, −2, or −3 in the lateral direction may correspond to the user shifting her head to the left by 1 mm, 2 mm, or 3 mm, respectively. An example of a non-linear change, a change of −1, −2, or −3 in the lateral direction may correspond to the user shifting her head to the left by 1 mm, 2 mm, or 4 mm (e.g., an exponential change).

Returning to method 400, at block 420, the renderer in the AR system renders the plurality of predictive images for the viewpoints, where the future object is located at a different location in each of the predictive images. Except for the intersection at "0, 0", each intersection of the matrix 500 corresponds to a possible, future orientation of the user's head. These orientations can be used to identify a possible viewpoint of the user. As shown by the blowout image, each intersection of the x- and y-axes includes a predictive image 520 and selection information 525. Because each of the predictive images generated using the matrix corresponds to a different user orientation or viewpoint, the AR content in the predictive images is different. The renderer generates the predictive image using the corresponding values in the x- and y-axis labels 505, 510. Using the bottom left intersection as an example, the renderer generates the predictive image 520 assuming the user will move her head −3 units to the left and −3 units down from the current position. As such, the predictive image 520 displays the future AR content at a location that corresponds to the user moving her head to the location corresponding to the bottom left most intersection in matrix 500. Thus, if the user does move her head to this location, displaying the predictive image 520 on the AR device results in the object of the AR content overlaying the selected surface correctly and avoids the latency issue shown in FIG. 3B.

Because each of the intersections in the matrix 500 corresponds to a different user orientation, each predictive image 520 displays the AR content in a slightly different manner. In this example, the AR content is shifted in the predictive images 520 left/right and up/down depending on the change in the lateral and vertical head movements. However, if another dimension in the matrix 500 is added which varies the distance (or depth) between the user and the AR surface, the size of the AR content in the predictive images 520 may also vary. Furthermore, the predictive images 520 in the matrix 500 may change according to a rotational view of the object of AR content. That is, one dimension of the matrix 500 may measure changes in the angle at which the user views the AR content on the surface. Using FIG. 2B as an example, because the AR content 260 is a 3D object, the view of the AR content 250 changes depending on which side of the mannequin 205 the user is located. When viewed from the front, the user sees the front of the shirt object, but when viewed from the back of the mannequin 205, the user sees the back of the shirt object. Thus, if the location of the user relative to the AR surface is one dimension in the matrix 500, then the different predictive images 520 may have slightly different views of the object of the AR content depending on the angle at which the user views the AR content.

In one embodiment, the total change of the dimensions in the matrix 500 is limited, thereby reducing the maximum change in the user's movement relative to the reference positions. One technique for limiting the total change in the dimensions of the matrix 500 considers the physical limitations of the human body. For example, for a given amount of time, the head can only move a maximum distance. Thus, the maximum and minimum values of the x- and y-axis labels 505, 510 may not exceed this maximum distance since it is impossible for the head to move to those positions before the future AR content needs to be displayed.

In another example, past movements of the user along with current movements can be used to limit the values of the dimensions in the matrix 500. For example, if the user's head is currently not moving (i.e., has no inertia), the maximum distance the head can move may be less than the distance the head could move if it was already moving. Thus, if the prediction engine determines from past sensor data that the head is stationary, the max/min values of the x- and y-axis labels 505, 510 may be smaller than if the head was moving. Similarly, if the head is moving in a certain direction (e.g., down), the prediction engine may predict the head will continue moving in this direction and extend the minimum values of the y-axis label 510 (e.g., the prediction engine adds changes of −4 and −5) and/or reduce the maximum values of the label 510 (e.g., remove +2 and +3 as possible movements). In another example, instead of extending the minimum values, the prediction engine may improve the granularity of the values where the head is more likely to move. For example, the prediction engine may change the matrix 500 to include rows for changes of −1.5 and −2.5 in the y-axis label 510.

In another embodiment, the prediction engine adjusts the values of the dimensions in the matrix 500 by identifying a particular motion pattern made by the user. For example, if an eye tracking sensor reports that the eyes of the user are looking to the left but the head remains looking straight ahead, the prediction engine may adjust the matrix 500 to anticipate that the user will soon move her head to align with the direction of her eyes. Moreover, the distance between the pupils of the user may vary the dimensions of the matrix. In another example, humans typically scan an area using a spiral motion. Once this motion is detected, the prediction engine can adjust the matrix in anticipation that the user will continue this motion by tailoring the matrix to predictively render images assuming the user's gaze will continue to follow the spiral path.

In another embodiment, the AR system may identify points of interest likely to attract the gaze of the user. For example, using facial recognition, the AR system may identify a person in the field of the view of the user. Because people typically make eye contact when talking to others, the prediction engine may adjust the matrix assuming the orientation of the user's head will move to make eye contact with the identified person. In another example, the AR system may determine that a person is in a particular room such as a museum and assume that the gaze of the user will move towards different exhibits in the room. The prediction engine can adjust the matrix to predictively render more images that are in the path between the current gaze of the user and the exhibits. In one embodiment, a point of interest could be identified by monitoring what objects previous users viewed when they are were in the current location of the user. In another example, the AR system may information pertaining to the layout of the room in which the user is located to predict that how objects in the room may affect the view of the user. For example, the AR system may determine that the user is moving in a particular direction such that an object in the environment will occlude a portion of the AR surface that the user is viewing in the distance. The AR system can account for the occlusion caused by the interfering object when rendering the predictive images.

Returning to method 400, at block 425, the AR system generates selection information 525 providing respective orientation data correspond to each one of the predictive images 520. That is, in addition to generating the predictive images 520 for each of the intersections, the matrix 500 includes selection information 525 which is used by the AR device to select one of the predictive images 520 for display. In one embodiment, the selection information 525 includes the respective orientation data used to render the predictive image 520. For example, the selection information 525 corresponding to the bottom left intersection may indicate that the predictive image 520 was rendered using a −3, −3 change relative to the reference positions. In one embodiment, instead of listing the orientation values corresponding to one of the predictive images 520, the selection information 525 may include a single value that is derived from combining the various values. The AR device may generate a similar value using current sensor data that can be compared to the selection information 525 in order to select one of the predictive images 520 for display.

Although the AR device may select only one of the predictive images while discarding the rest, in one embodiment, the AR system may transmit the predictive images to a different AR device. For example, multiple users may be in the same or similar location while viewing the same AR surface using similar viewpoints. The predictive images rendered for a first user may correspond to a possible, future orientation of a second user. Thus, the AR system would not need to re-render the predictive image for the second user, but can transmit the same image (or a slightly modified version thereof) to the AR device worn by the second user. Stated differently, the future possible viewpoints of the two users may overlap, in which case, the AR system may render the predictive images corresponding to the overlapping viewpoints only once. In one embodiment, the AR system may track the trajectory and/or the positions of the AR devices to determine if the viewpoints overlap.

At block 430, the AR system transmits the predictive images and the selection information to the AR device. In one embodiment, the calculations performed at blocks 410, 415, 420, and 425 may be performed on a computing device separate from the AR device as shown in FIG. 1. The computing device may be a server in a data center, a personal computing device such a smartphone, desktop computer, or laptop wirelessly coupled to the AR device, or computing resources in a cloud application. Any number of the blocks in method 400 may be performed by the computing device thereby enabling the AR device to include less processing power and/or memory which reduces the cost of the AR device. However, in one embodiment, method 400 may be performed by computing resources located on the AR device, in which case, block 430 may be omitted. For example, the AR device may perform method 400 when its processing resources are underutilized, and thus, additional processing power is available to render the predictive images.

Various embodiments described above refer to a user moving in 3-D space resulting in a changing perspective of a surface augmented with virtual content. It will be appreciated, however, that the present embodiments are more generally directed to a changing user perspective caused by any relative movement between the user and the augmented surface, whether that changing perspective is caused by movement of the user or movement of the augmented surface or both. Thus, in one embodiment, the AR system may track the movements of the physical surface that is overlaid with the AR content using steps similar to those shown in method 400. In addition to generating a matrix for possible future movements of the user, in this embodiment, the prediction engine generates a matrix for possible future movements of the physical surface in the real world. For example, the AR system may include an object tracking system that tracks the movement of the physical surface in 3D space. Based on the past and/or current locations of the surface, the prediction engine generates a matrix like the one shown in FIG. 5 except the dimensions relate to movement of the physical surface instead of the user or the AR device. The renderer can then generate predictive images using the possible future movements of the physical surface. In one embodiment, the possible movements of the user and the surface may be combined to generate a single matrix. For example, two of the dimensions of the matrix may correspond to changes in the orientation of the user, while two other dimensions of the matrix correspond to changes in the location of the physical surface in 3D space. Thus, as the user or the physical surface move (thereby changing the relative orientation between the user and the physical surface), the AR system already has predictive images that correspond to the new locations of the user and the physical surface. The AR device can use sensor data indicating the current orientation of the user and the current location of the physical surface in 3D space to select of the predictive images for display.

In one embodiment, the computing device in the AR system renders only a portion of the AR content that is displayed on the AR device. In this example, the computing device renders a sub-set of the objects in the image while the AR device renders the remaining objects. In this hybrid-rendering scenario, the AR device selects one of the predictive images transmitted from the computing device and performs an additional rendering process to add additional objects into the selected image. For example, the AR device may have access to information that the computing device does not have, such as the location of other AR content in the user's viewable area which should be added before the selected image is displayed.

In another example of hybrid rendering, the computing device selects which object (or objects) to render in the predictive images according to the complexity of the object. The computing device may select objects that require the most time or the most processing resources to render, while the AR device renders objects that are computationally less demanding. For example, the computing device may render objects that have a significant amount of detail or color variation such as hair or fire while less detailed objects are rendered and added to the selected image by the AR device before the image is displayed.

Figure 6:
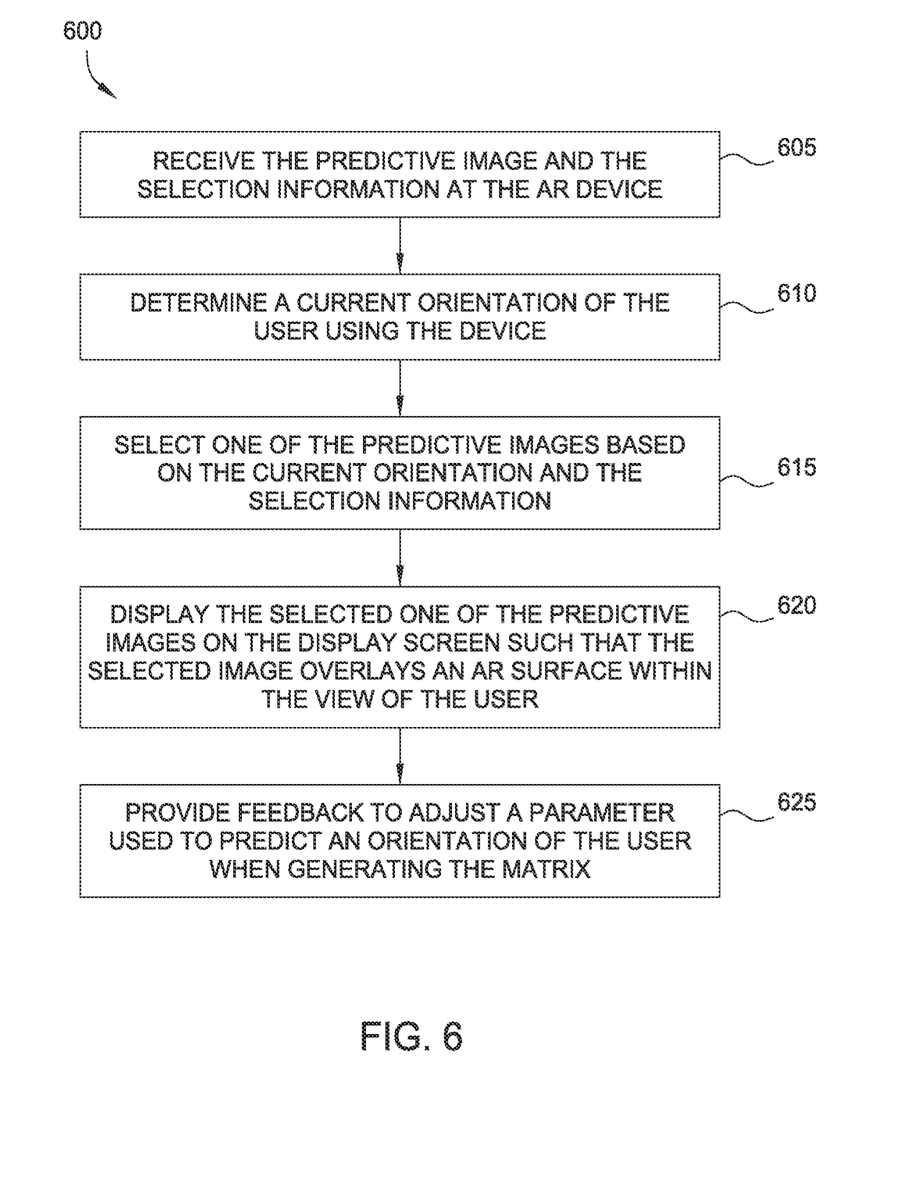
FIG. 6 is a flowchart for selecting one of the predictively rendered images for display, according to various embodiments.

FIG. 6 is a flowchart illustrating a method 600 for selecting one of the predictive images for display, according to various embodiments. At block 605, the predictive images and the selection information are received at the AR device. In one embodiment, the AR device is communicatively coupled to a separate computing device using a wired or wireless communication link. For example, the AR device may receive the predictive images and selection information over a WAN such as the Internet. In another example, the AR device may have a direct wireless communication with the computing device using, e.g., Bluetooth or other close range wireless communication technique. In one embodiment, the bandwidth of the communication link may dictate the number of predictive images generated by the computing device. For example, if the AR device displays a new image every tenth of a second and the bandwidth permits the AR device to at most a thousand images per second, the computing device can send only one hundred predictive images for each new image displayed on the AR device. As such, the computing device may use one or more of the techniques described in method 400 to limit the size of the matrix such that computing device renders less than one hundred predictive images for each new frame of AR content. Different techniques for limiting the number of predictive image are described below in the remark accompanying FIG. 7.

At block 610, selection logic in the AR device determines a current orientation of the user. In one embodiment, the AR device receives sensor data indicating the current orientation of the user. The sensor data may be generated by sensors located on the AR device or external sensor. For example, the AR device may use accelerometer data measured using a cellphone on the user to help determine the current user orientation. By combining the sensor data from multiple sensors, the selection logic can identify a current orientation of the head of the user. In one embodiment, the AR device may combine sensor data from multiple sensors to generate a single value representing the orientation of the user. As discussed above, when generating the selection information 525 shown in FIG. 5, the computing device may combine the values of the x- and y-axis at the intersection into a single value which is stored as selection information 525. Using the same technique, the AR device may generate a similar value using the sensor data received at block 610 which can be compared to the selection information 525.

At block 615, selection logic in the AR device selects one of the predictive images based on the current orientation and the selection information. Stated differently, the selection logic compares the current sensor values to the values stored in the selection information which were used to generate the predictive images. For example, the AR device may determine a location of the head of the user in 3D space and determine which predictive image best matches that location by evaluating the selection information for each of the predictive images. In one embodiment, the data in the selection information may be same type of measurements as the sensor data such that a direct comparison is possible. For example, the selection information for each of the predictive images may contain an angle of rotation that corresponds to an angle of rotation measured by a sensor on the AR device. These values can be compared to see which predictive image was rendered using the same (or most similar) angle of rotation as the current value measured by the sensor. In other embodiments, an indirect comparison may be used where the selection logic processes the selection information using a predefined algorithm to output a similarity score between the selection information and the received sensor data. For example, the selection information may include data such as x and y coordinates in a two-dimensional plane that can be compared to one or more accelerations measured by the sensor devices using the predefined algorithm.

In one embodiment, the selection logic uses one or more predefined criteria to determine a match. The criteria may include selecting the predictive image that has selection information with the best similarity score. In another embodiment, the criteria may include a threshold where the AR device selects the first predictive image it evaluates which has selection information that satisfies the threshold, even if the selected predictive image is not the best match for the current user orientation. Doing so may speed up the selection process.

At block 620, the AR device displays the selected one of the predictive images on the display screen such that the selected image overlays an AR surface within the view of the user. In one embodiment, the displayed image includes a transmissive portion and an opaque portion. The transmissive portion permits light reflecting off surfaces in the real-world to pass through the display screen and enter the eyes of the user. In contrast, the opaque portion may display the AR content, thereby partially or completely occluding one or more surfaces in the real world.

In one embodiment, instead of including a transmissive portion, the AR device can include a camera that captures images of the real world which are then processed so that AR content replaces one or more surfaces in the captured image. Thus, when viewed by the user, a first portion of the displayed image represents objects as they actually appear in the real world, while a second portion includes the AR content which replaces the identified surface in the real-world. Stated differently, the first portion of the displayed image may be the same, or similar, to what the user would see if the display screen was not there, while the second portion includes AR content which overlaps (i.e., replaces) one or more surfaces in the real world.

At block 625, the AR device provides feedback to adjust a parameter used to predict an orientation of the user when generating the matrix. In one embodiment, the AR device transmits feedback information to the computing device generating the predictive images which the computing device uses to adjust the matrix, thereby affecting how new predictive images are generated. In one embodiment, the computing device uses the feedback to adjust parameters such as the values of the dimensions defining the matrix. For example, if the feedback indicates that the user's head is accelerating much faster than anticipated by the matrix, the computing device may extend the values of the matrix in the same direction as the acceleration. Moreover, if the feedback indicates that a different type of measurement should be considered (e.g., the location of the user in 3D space), the computing device may add a new dimension to the matrix so that the predictive images are rendered using the new measurement. Thus, the adjusted parameters may include the values of the dimensions in the matrix, the number of dimensions in the matrix, the number of predictive images rendered, and the like.

In one embodiment, the feedback provided by the AR device can be used as an input to a learning algorithm in the computing device which adjusts the parameters used to generate the matrix. Furthermore, the current workload of the computing device or the current bandwidth of the communication link between the AR device and the computing device may also be used as inputs into the learning algorithm. If, for example, the workload on the computing device increases or the bandwidth of the link decreases, the learning algorithm may reduce the size of the matrix thereby reducing the number of predictive images rendered. In this manner, the learning algorithm can adjust the parameters of the matrix to generate predictive images that better match the orientation changes made by the user as well as adjusting the parameters in response to computing performance changes in the AR system.

Figure 7:
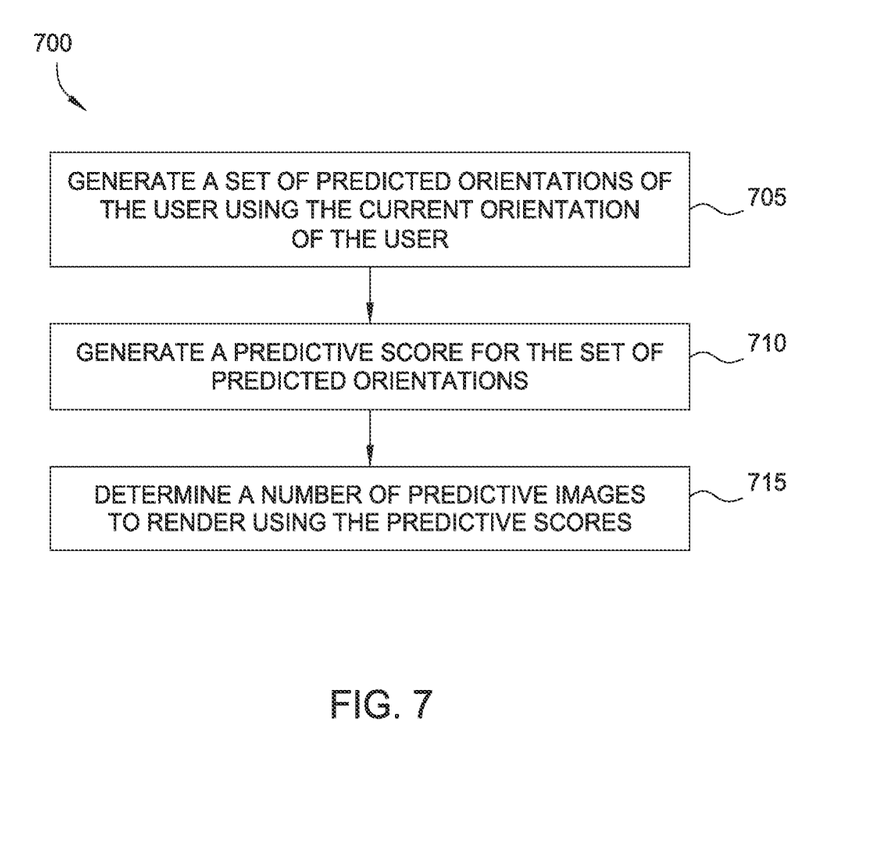
FIG. 7 is a flowchart for selectively limiting the number of predictive images rendered, according to various embodiments.

FIG. 7 is a flowchart illustrating a method 700 for selectively limiting the number of predictive images rendered, according to various embodiments. At block 705, the computing device generates a set of predicted orientations of the user using the current orientation of the user. For example, the AR device may transmit the current sensor data to the computing device which then uses this information to generate the matrix 500 shown in FIG. 5. In one embodiment, the current sensor data may be used to determine the reference positions "0" on the x- and y-axes. With the current user orientation set, the computing device then determines how to best set the other values in the x- and y-axes to predict changes to the user's orientation, where each intersection of the axes in the matrix 500 represents a different, predicted user orientation.

At block 710, the prediction engine in the computing device generates a predictive score for the set of predicted orientations. In one embodiment, the prediction engine may use the learning algorithm described above to identify values for the dimensions of the matrix that are more likely to be the future orientation of the user. For example, if current orientation data received from the AR device indicates that user's head is accelerating in a particular direction, the prediction engine may extend the values of the matrix in that direction. That is, these values are given higher scores. Conversely, the prediction engine may reduce the values of the matrix in the opposite direction (i.e., assign these values a lower score) since it is unlikely the user can reverse directions before the next frame in the AR content is displayed. The prediction engine uses the predictive scores to adjust the parameters of the matrix which can affect the number of predictive images rendered. Other factors that may be used to generate predictive scores include the physical limitations of the human body, past user movements, identified motion patterns made by the user, or points of interests near the user, which were discussed in detail above.

At block 715, the prediction engine determines a number of predictive images to render using the predictive score. For example, using the predictive scores, the prediction engine may reduce the length of the axes thereby reducing the number of predictive images generated. Referring to FIG. 5, if the scores indicate that the future orientation of the user is more likely to correspond to a user orientation on the right half of the matrix 500, then the prediction engine can delete the left side of the y-axis 505 thereby reducing the matrix 500 (and the number of predictive images rendered) by half.

In another embodiment, the computing device uses the predictive scores to limit the number of predictive images transmitted to the AR device after the images have been rendered. For example, if the computing device renders one hundred images, the device may use the predictive scores for the corresponding orientations to determine a subset of those images to send to the AR device. For instance, the bandwidth of the communication link may have reduced requiring the computing device to send a limited number of the rendered predictive images. Thus, the computing device may transmit fewer images to the AR device than were rendered which reduces the amount of bandwidth required to transmit the images to the AR device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the renderer 155 shown in FIG. 1) or related data available in the cloud. For example, the renderer 155 could execute on a computing system in the cloud to generate the predictive images. In such a case, the renderer 155 could generate the image using the AR content 157 which could be stored at a storage location in the cloud. Doing so allows a user to access the predictive from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    identifying a physical surface to overlay with augmented reality (AR) content;
    identifying a future object of the AR content to be displayed on a display screen of a device supported by a user;
    identifying a multi-dimensional matrix of possible future viewpoints of the user, wherein each possible viewpoint is based at least in part on possible orientation changes of the user in 3D space;
    determining a number of predictive images to render based at least in part on a predictive score associated with each of the possible future viewpoints of the user, the predictive scores indicating a likelihood that the user will be at the associated possible future viewpoint at a future time;
    rendering, for each of the possible viewpoints, the number of predictive images for the display screen;
    transmitting the predicted images to the device;
    determining a current orientation of the user using the device; and
    selecting only one of the predicted images for display on the display screen based at least in part on the current orientation.

2. The method of claim 1, wherein the device is a headset worn by the user, and wherein the predicted orientation changes comprises predictive movements of a head of the user along at least two directions.

3. The method of claim 1, wherein selecting only one of the predicted images comprises:
    comparing the current orientation to the possible orientation changes used to identify the possible viewpoints; and
    selecting the predicted image corresponding to a possible viewpoint that matches the current orientation according to one or more predefined criteria.

4. The method of claim 1, wherein the possible orientation changes are limited by a maximum orientation change of one or more body parts during a fixed period of time.

5. A system, comprising:
    one or more computer processors; and
    one or more memories containing a program which, when executed on the one or more computer processors, performs an operation for augmenting reality, the operation comprising:
        identifying an object in AR content to be displayed on a display screen of a device supported by a user;
        generating a set of possible future orientations of the user based at least in part on a current orientation of the user;
        determining a number of predictive images to render based at least in part on a predictive score associated with each of the possible future orientations of the user, the predictive scores indicating a likelihood that the user will be at the associated possible future orientation at a future time;
        rendering the number of predictive images for display on the display screen, wherein the object is located at a different location in each of the predictive images; and
        generating selection information, wherein the selection information provides respective orientation data corresponding to each one of the predictive images for use by the device to select one of the predictive images for display.

6. The system of claim 5, wherein the predictive images each corresponds to a different possible future orientation of the user.

7. The system of claim 6, wherein the possible orientation comprises future movements of a head of the user along at least two directions.

8. The system of claim 5, the operation comprising:
    generating the predictive scores based at least in part on at least one of past movements of one or more body parts of the user and a geographic location of the user.

9. The system of claim 5, wherein generating the set of possible orientations of the user comprises:
    determining a maximum possible deviation of one or more body parts from the current orientation of the user during a fixed period of time, wherein the set of possible orientations is bound by the maximum possible deviation.

10. The system of claim 5, the operation comprising:
    receiving feedback from the device indicating how closely the selected one of the predictive images matched an orientation of the user when the selected one of the predictive images was displayed on the display screen.

11. The system of claim 10, the operation comprising:
    adjusting at least one parameter used to predict an orientation of the user at a future time; and
    rendering a second plurality of predictive images for display on the display screen using the adjusted parameter.

12. A method, comprising:
    identifying an object in AR content to be displayed by a device supported by a user, wherein the object corresponds to a physical surface viewable by the user;
    generating a set of possible orientations of the user based at least in part on a current orientation of the user;
    determining the number of predictive images to render based at least in part on a predictive score associated with each of the possible orientations of the user, the predictive scores indicating a likelihood that the user will be at the associated possible orientation at a future time;
    rendering the number of predictive images for display by the device, wherein the object is positioned at a different location in each of the predictive images; and
    generating selection information, wherein the selection information provides respective orientation data corresponding to each one of the predictive images for use by the device to select one of the predictive images for display.

13. The method of claim 12, wherein the predictive images each corresponds to a different possible future orientation of the user.

14. The method of claim 13, wherein the possible orientation comprises future movements of a head of the user along at least two directions.

15. The method of claim 12, further comprising:
generating the predictive scores based at least in part on at least one of past movements of one or more body parts of the user and a geographic location of the user.

16. The method of claim 12, wherein generating the set of possible orientations of the user comprises:
determining a maximum possible deviation of one or more body parts from the current orientation of the user during a fixed period of time, wherein the set of possible orientations is bound by the maximum possible deviation.

17. The method of claim 12, further comprising:
receiving feedback from the device indicating how closely the selected one of the predictive images matched an orientation of the user when the selected one of the predictive images was displayed.

18. The method of claim 17, further comprising:
adjusting at least one parameter used to predict an orientation of the user at a future time; and
rendering a second plurality of predictive images for display using the adjusted parameter.

19. An augmented reality (AR) device, comprising:
a display screen; and
selection logic configured to:
receive predictive images and selection information, wherein each of the predictive images includes an object in AR content, wherein the object is located at a different location in each of the predictive images, wherein a number of the predictive images received at the AR device is determined based at least in part on a predictive score associated with each of a set of possible future orientations of the user, the predictive scores indicating a likelihood that the user will be at the associated possible future orientation at a future time,
receive sensor data indicating a current orientation of a user supporting the AR device,
select one of the predictive images based at least in part on the current orientation of the user and the selection information, wherein the selection information provides respective orientation data corresponding to each one of the predictive images, and
display the selected one of the predictive images on the display screen such that the object overlays an identified surface viewed by the user.

20. The augmented reality device of claim 19, wherein selecting one of the predictive images comprises:
identifying a match between the orientation data of the selected one of the predictive images and the current orientation of the user according to one or more predefined criteria.

21. The augmented reality device of claim 19, wherein only one of the predictive images is selected and the remaining predictive images are discarded.

22. The augmented reality device of claim 19, further comprising:
a communication interface configured to transmit the sensor data and receive a new set of predictive images comprising a new object of AR content to be displayed on the display screen, wherein the new set of predictive images is rendered based at least in part on the transmitted sensor data.

* * * * *